United States Patent
Swett

(10) Patent No.: US 9,952,343 B2
(45) Date of Patent: Apr. 24, 2018

(54) RHODONEA CELL ACOUSTIC HYPERLENS FOR THRU-CASING ULTRASONIC SENSORS

(71) Applicant: BAKER HUGHES INCORPORATED, Houston, TX (US)

(72) Inventor: Dwight W. Swett, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 89 days.

(21) Appl. No.: 15/215,159

(22) Filed: Jul. 20, 2016

(65) Prior Publication Data

US 2018/0024265 A1    Jan. 25, 2018

(51) Int. Cl.
| G01V 1/40 | (2006.01) |
| G01V 1/50 | (2006.01) |
| G10K 11/30 | (2006.01) |
| E21B 47/00 | (2012.01) |
| E21B 49/00 | (2006.01) |

(52) U.S. Cl.
CPC ............ *G01V 1/50* (2013.01); *E21B 47/0005* (2013.01); *E21B 49/00* (2013.01); *G10K 11/30* (2013.01)

(58) Field of Classification Search
CPC ...... G01V 1/50; G10K 11/30; E21B 47/0005; E21B 49/00
USPC .......................................................... 367/35
See application file for complete search history.

(56) References Cited

U.S. PATENT DOCUMENTS

| 5,495,174 A | 2/1996 | Rao et al. |
| 2005/0096847 A1 | 5/2005 | Huang |
| 2009/0199630 A1 | 8/2009 | Difoggio et al. |
| 2009/0213690 A1 | 8/2009 | Steinsiek et al. |
| 2010/0101860 A1 | 4/2010 | Wassermann et al. |

(Continued)

FOREIGN PATENT DOCUMENTS

| WO | 96-21871 A1 | 7/1996 |
| WO | 2013089683 A1 | 6/2013 |

OTHER PUBLICATIONS

Milton, Graeme W., et al., "Which Elasticity Tensors are Realizable?", Jnl of Engr Materials & Technology, vol. 117, pp. 483-493 (Oct. 1995).

(Continued)

*Primary Examiner* — Daniel L Murphy
(74) *Attorney, Agent, or Firm* — Mossman, Kumar & Tyler, PC

(57) ABSTRACT

Apparatus, systems, and methods for investigating a subsurface volume of interest from a borehole. Apparatus comprise an enclosure configured for conveyance along the borehole; an acoustic source in the enclosure configured to generate acoustic signals; a lens assembly disposed in the enclosure and next to the acoustic source, the lens assembly being formed of a plurality of cells, each cell formed as a column oriented transverse to a direction of travel of the acoustical signals. Each cell comprises a plurality of cell segments with each cell segment of the plurality comprising at least one arcuate wall and at least one radial finger, and wherein the cell segments are oriented in alignment with a rhodonea conformal mapping geometry in a plane transverse to the column to cause acoustic waves to travel at a different speed in each of three orthogonal directions.

20 Claims, 12 Drawing Sheets

(56) References Cited

U.S. PATENT DOCUMENTS

| | | | |
|---|---|---|---|
| 2013/0025961 A1* | 1/2013 | Koh | F16F 15/02 |
| | | | 181/207 |
| 2013/0030705 A1 | 1/2013 | Pei et al. | |
| 2014/0126322 A1* | 5/2014 | Cipolla | G10K 11/18 |
| | | | 367/1 |

OTHER PUBLICATIONS

Milton, Graeme W. et al., "On Cloaking for Elasticity and Physical Equations With a Transformation Invariant Form,", New Jnl of Physics 8, 248, 20 pp. (2006).

Fokin, Vladimir et al., "Method for Retrieving Effective Properties of Locally Resonant Acoustic Metamaterials," Physical Review B 76, 144302, 5 pp. (2007).

Norris, Andrew N., "Acoustic Cloaking Theory," Proc. R. Soc A 464, pp. 2411-2434 (2008).

Norris, Andrew N., "Acoustsic Metafluids," J. Acoust. Soc. Am. 125 (2), pp. 839-849 (2009).

Popa, Bogdan-Ioan et al., "Design and Characterization of Broadband Acoustic Composite Metamaterials," Physical Review B. 80, 174303, 6 pp. (2009).

Shen, Chen et al., "Anisotropic Complementary Acoustic Metamaterial for Canceling Out Aberrating Layers," Physical Review X 4, 041033, 7 pp. (2014).

Norris, Andrew N., "Acoustic Cloaking," Acoustical Society of America, Acoustics Today, vol. 11, Issue 1, pp. 38-46 (2015).

ISR in PCT/US2014/062585 dated Feb. 13, 2015.

IPRP and Written Opinion in PCT/US2014/062585 dated May 12, 2016.

\* cited by examiner

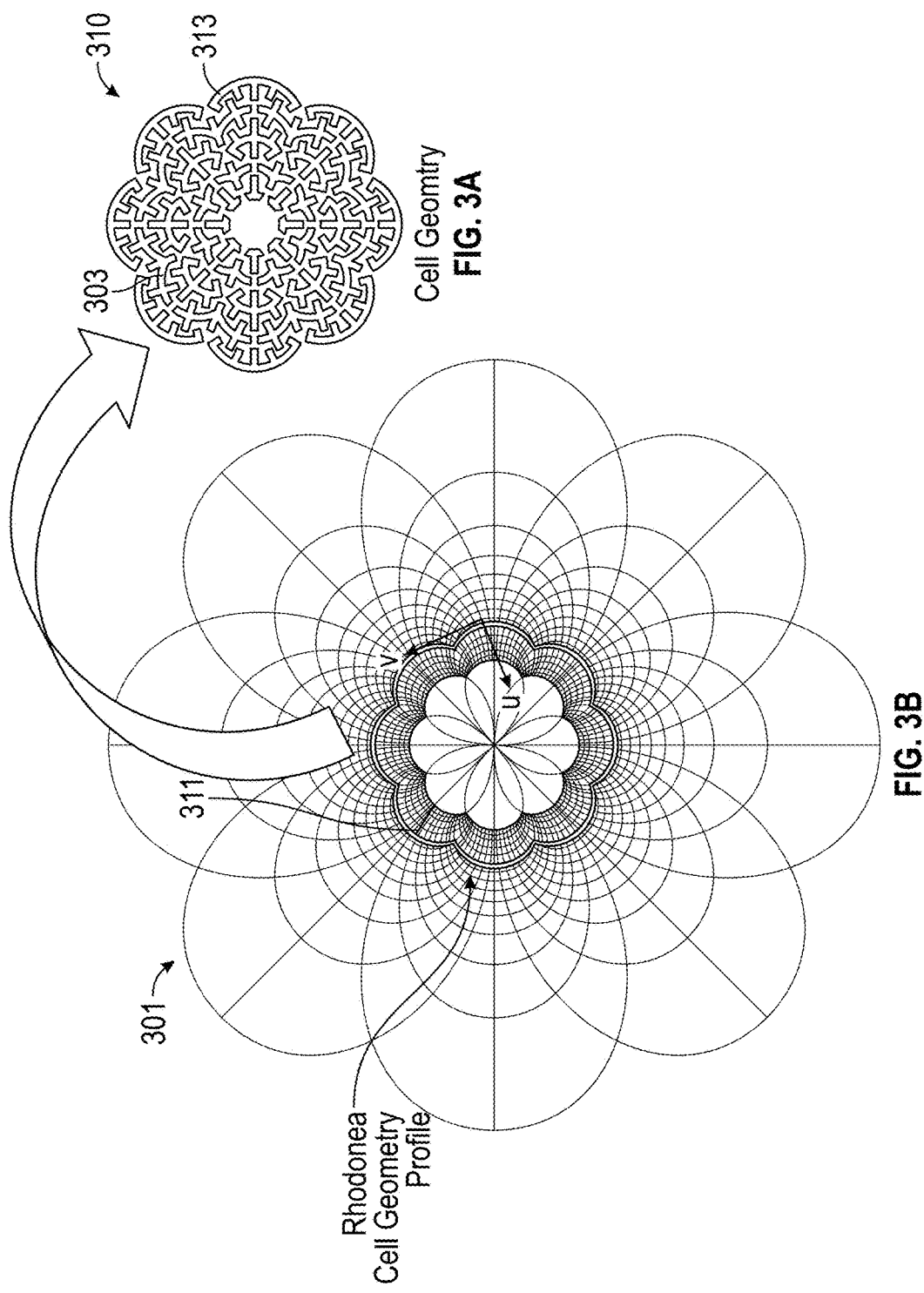

US 9,952,343 B2

RHODONEA CELL ACOUSTIC HYPERLENS FOR THRU-CASING ULTRASONIC SENSORS

FIELD OF THE DISCLOSURE

This disclosure relates to acoustic sensors and methods of making and using such acoustic sensors in various tools, including acoustic logging tools.

BACKGROUND OF THE DISCLOSURE

Downhole acoustic logging tools, which are used to investigate subsurface features, can include one or more acoustic transmitters or sources and a number of acoustic receivers. These tools may also include a transceiver that can function as a transmitter and a receiver. In either case, the transmitters emit acoustic energy into the subsurface environment surrounding the wellbore. The acoustic signals are reflected by interfaces associated with the wellbore, well structures, and/or the formation. The reflected acoustic signals are detected by the receivers in the logging tool and processed to provide estimates of one or more properties of the wellbore, well structures, and/or the formation. The present disclosure provides acoustic sensors that utilize a metamaterial lens to manipulate such acoustic waves.

SUMMARY OF THE DISCLOSURE

Aspects of the present disclosure include apparatus, systems, and methods for investigating a subsurface volume of interest from a borehole. Apparatus may include an enclosure configured for conveyance along the borehole; an acoustic source in the enclosure configured to generate acoustic signals; and a lens assembly disposed in the enclosure and next to the acoustic source. The lens assembly may be formed of a plurality of cells. The plurality of cell segments may project from a common base. Each cell may be formed as a column oriented transverse to a direction of travel of the acoustical signals. A metamaterial created by the plurality of cells may deform with a different bulk moduli in each of the three orthogonal directions.

Each cell may comprise a plurality of cell segments with each cell segment of the plurality comprising at least one arcuate wall and at least one radial finger. The plurality of cell segments may have identical dimensions. The plurality of fingers may be radially staggered to nest between one another. The cell segments may be oriented in alignment with a rhodonea conformal mapping geometry in a plane transverse to the column to cause acoustic waves to travel at a different speed in each of three orthogonal directions. The cell segments may be arranged in alternating radial rings of cell segments, comprising alternating rings of segments of a first type and of a second type, wherein: segments of the first type comprise a single arcuate wall; and segments of the second type comprise a plurality of arcuate walls.

The conformal mapping geometry may comprise a set of Rhodonea constant coordinate contours with [x,y] coordinates located within a four-leaf boundary of a Cartesian frame. the rectangular [x,y] Cartesian coordinates may be related to [u,v] mapped coordinates by the relations:

$$x = \pm \frac{1}{\rho}\sqrt{\rho + u}$$

-continued $$y = \pm \frac{1}{\rho}\sqrt{\rho - u}$$

$$\rho = \sqrt{u^2 + v^2}.$$

In general embodiments, the apparatus above may be implemented as an acoustic tool. The acoustic tool may include a transducer configured to generate and detect an acoustic wave in cooperation with the lens assembly. The lens assembly may be spaced-apart from the acoustic source. The plurality of cells may preferably be arranged in a grid projecting from a common base, but may also be arranged according to a conformal mapping geometry. The plurality of cells may form a cellular lattice having rectilinear periodicity in both directions along the grid.

In aspects, the present disclosure provides an apparatus for investigating a subsurface volume. The apparatus may include an enclosure configured to be conveyed along a wellbore, an acoustic transducer disposed in the enclosure and generating acoustical signals, an electronics assembly disposed in the enclosure and controlling the acoustic transducer, and a lens assembly. The apparatus may include a rotary device rotating the enclosure. The lens assembly may be disposed in the enclosure and next to the acoustic transducer. The lens assembly may be formed of a plurality of cells. Each cell may be formed as a column oriented transverse to a direction of travel of the acoustical signals.

In aspects, the present disclosure provides a method for investigating a subsurface volume. The method may include positioning an acoustic tool in a wellbore. The acoustic tool may include an enclosure configured for conveyance along the borehole; an acoustic source in the enclosure configured to generate acoustic signals; and a lens assembly disposed in the enclosure and next to the acoustic source. The lens assembly may be formed of a plurality of cells. The plurality of cell segments may project from a common base. Each cell may be formed as a column oriented transverse to a direction of travel of the acoustical signals. A metamaterial created by the plurality of cells may deform with a different bulk moduli in each of the three orthogonal directions.

Each cell may comprise a plurality of cell segments with each cell segment of the plurality comprising at least one arcuate wall and at least one radial finger. The plurality of cell segments may have identical dimensions. The plurality of fingers may be radially staggered to nest between one another. The cell segments may be oriented in alignment with a rhodonea conformal mapping geometry in a plane transverse to the column to cause acoustic waves to travel at a different speed in each of three orthogonal directions. The method may include directing the acoustic waves through an adjacent aberrating media that at least partially blocks the direction of travel of the acoustic waves and into the volume of interest. The aberrating media may be a metal tubular, the volume of interest may comprise cement. Methods may include using the acoustic transducer to detect a reflected signal from the volume of interest that has travelled through the aberrating media and the lens assembly. Methods may include receiving an acoustic signal responsive to the acoustic waves comprising information relating to the volume of interest; and using the information to estimate a parameter of interest. Methods may include estimating quality of a cement bond between the cement and the metal tubular.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 3A-3E illustrate example metamaterial cells with cell segments oriented in alignment with a rhodonea conformal mapping geometry for manipulating an acoustic wave in accordance with the present disclosure;

DETAILED DESCRIPTION

Figure 1:
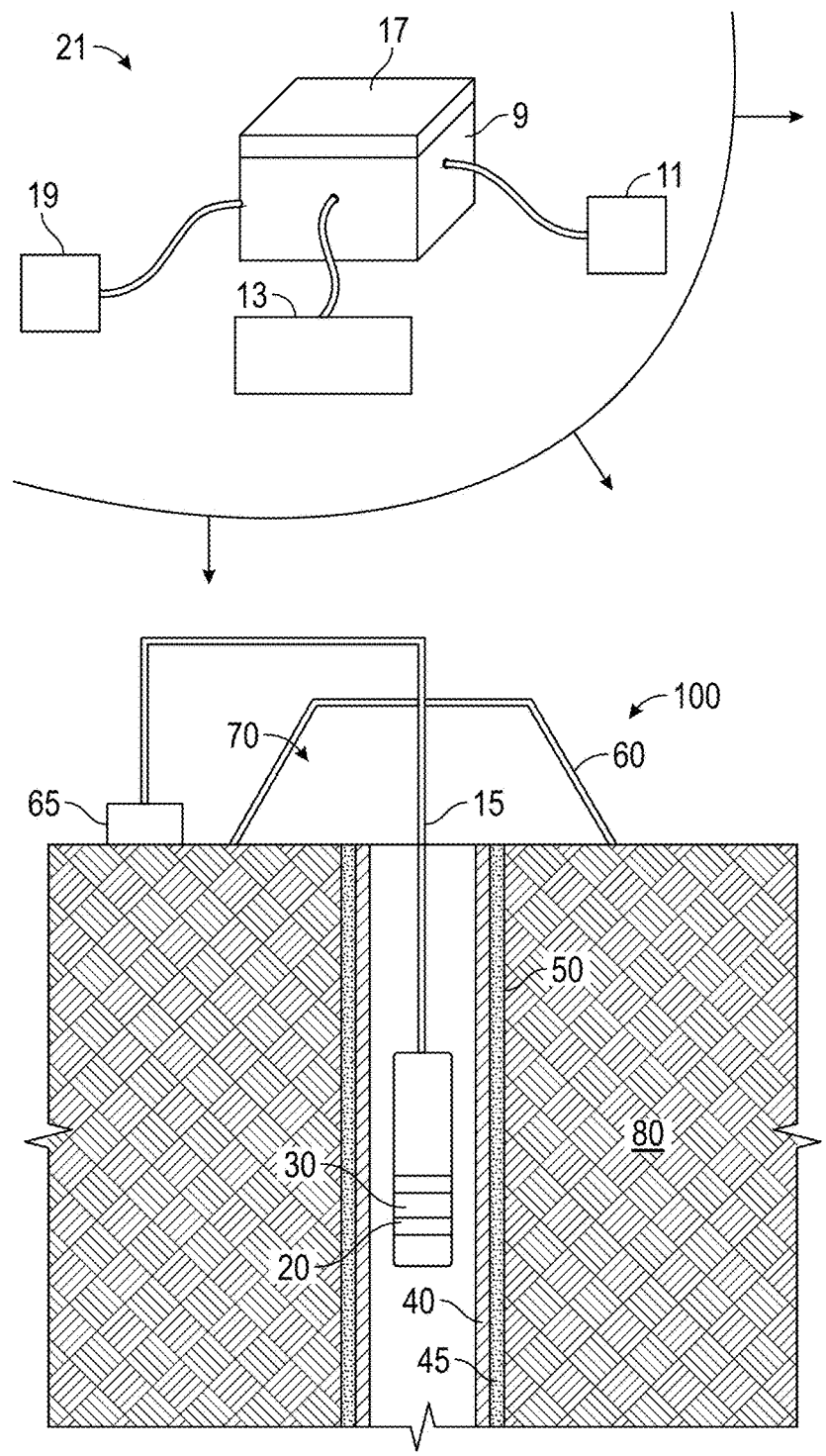
FIG. 1 schematically illustrates a downhole acoustic logging system in accordance with embodiments of the present disclosure.

Aspects of the present disclosure include an ultrasonic hyperlens that may be employed in thick thru-casing imaging sensor implementations. In aspects, the present disclosure relates to acoustic devices and related methods for investigating a volume of interest when a signal transmission path to that volume of interest is partially or completely obstructed by an aberrating media. In aspects, the present disclosure also relates to acoustic devices and related methods for investigating a volume of interest when a signal transmission path from that volume of interest is partially or completely obstructed by an aberrating media.

There are a number of challenges that confront operators as they seek to determine the quality of the cement bond and the fill-up between the casing and cap rock in downhole production structures. Key among these is the lack of effective technologies that can determine the quality of the cement structure by thru-casing direct measurements. The cement forms part of the well construction to provide structural support to the casing and it also creates zonal isolation of unwanted fluids from the wellbore. This zonal isolation minimizes loss of oil and gas reserves to cross-flow between zones, and in the extreme cases, a loss of cement bond integrity can cause blowouts at the wellhead. Consequently, a key element of oil and gas production operations is the assessment of the quality of the cement structure in the well sections. This has become especially important to the industry in the aftermath of recent events in the Gulf of Mexico.

Classical cement bond inspection techniques measure the amplitude and attenuation of acoustic pulses propagating axially along the steel casing from a single transmitter to a single receiver. Highly attenuated signals correspond to good quality cement bonding and lightly attenuated signals indicate bond voids and/or free-pipe annuli. A slightly more advanced cement mapping technique operates on the same principles but uses multiple oriented acoustic receivers to recover amplitude data along multiple radial directions from one or more transmitters.

An even more advanced approach uses ultrasonic pulses from a transducer and measures radially instead of axially. This radially propagating acoustic pulse excites the casing in the thickness dimension resulting in vibrations that attenuate rapidly or slowly depending on the contact media with the casing. A large amount of the acoustic energy is reflected back to the transducer, while most of the remainder acts to resonate the casing and is dissipated by damping dominated by the bond contacts. Industry experts have concluded that when there is good cement bonding around the casing, they may infer that the bond to the cap rock is usually good too. When the cement annulus is very thin the method responds strongly to rock formation arrivals, and when the cement is thick the formation reflections may be too small to measure the bond to the cap rock. The best of the interpretations is made by combining multiple methods since inference plays a major role in applying these techniques.

U.S. patent application Ser. No. 15/130,312, submitted by the inventor of the present application, discloses octagonal interleaving cell geometry in a propagation along a set of Bipolar constant coordinate contours with [x, y] coordinates located in the first and fourth quadrant of the Cartesian frame. The cellular lattice was formed with curvilinear periodicity in both directions along the [u,v]contours. Scaling of the cell geometry anisotropically was disclosed in order to fit and align the cell axes with the contour tangent and normal vectors. The inherent flow-lines of the lattice periodicity then converge to a focus of nearly collimated contour lines, the location and size of which is determined by the selection of the mathematical parameter R and the [u,v] boundary values that define the lens profile. These geometric focus lines translate into the acoustic wave propagation field and enhance thru-casing intensity transmission and spot-size concentration. Fabrication of anisotropic sizing of the cell geometry may result in cellular features size smaller than achievable with conventional 3D micro-laser sintering technology, however, such that micro-laser sintering may be impractical.

The dearth of effective technologies that can determine the quality of a cement structure by thru-casing direct measurements through thick casing is problematic. Thick casing imaging is technologically challenging, and even more difficult to attain while still maintaining the capability to address typical thin casing thickness. For the downhole acoustic imaging applications described above, an acoustic lens enabling transmission and receiving of ultrasound through aberrating media including a thick steel casing is highly desirable. "Thick casing," as used herein, in relation to steel casing, relates to casing having a thickness of approximately 1 inch.

Aspects of the present disclosure include a lens derived from a matrix of artificial acoustic metamaterial cells that give the lens unusual dynamic properties, such as, for example, double anisotropic material properties (e.g., anisotropic density and bulk modulus tensors). The metamaterial cell design may comport with a rhodonea conformal mapping geometry that develops focus lines concentrated within the cell loci which translate into the acoustic wave propagation field, thus extending the interaction path length of the wave with the resonant features of the cell. The double anisotropy may lead to resonant hyperbolic frequency dispersion characteristics that generate quasi-complementary thru-casing ultrasonic transmissions with a flat lens design. These thru-casing ultrasonic transmissions may be reciprocal, meaning that the quasi-complementary ultrasonic phenomenon is at work for signals emanating from the hyperlens sensor within the cased borehole as well as on signals received from reflections outside the casing. The ultrasonic transmissions with the lens may amplify the thru-casing intensity of the sensor by more than +30 dB, and the enhanced reciprocity may allow more than 30 percent signal return in a simulated pulse-echo mode. The thick thru-casing transmission enhancement may also develop without the interference of background noise usually associated with casing excitations that historically inhibit conventional thru-casing ultrasonic imaging.

Aspects of the present disclosure include apparatus for enhanced thick thru-casing transmission while maintaining standard-casing capabilities. Techniques are disclosed herein for thru-casing ultrasonic imaging for a range of casing thicknesses, including those casings having thicknesses of approximately one inch. One example described herein is that of using a conjugate approach in which a Rhodonea conformal mapping forms the cell interleaf geometry and a polygonal (rectangular) lattice forms the lens cellular array. The cellular lattice is formed with rectilinear periodicity in both directions along the [x, y] axes, with a constant size cell geometry that facilitates manufacture using micro-laser sintering. The rectangular Cartesian coordinates may be related to the mapped coordinates by the relations:

$$x = \pm \frac{1}{\rho}\sqrt{\rho + u}$$

$$y = \pm \frac{1}{\rho}\sqrt{\rho - u}$$

$$\rho = \sqrt{u^2 + v^2},$$

where [u,v] are the Rhodonea conformal domain coordinates (discussed below with respect to the constant coordinate [x, y] plot of FIG. 3B).

General apparatus embodiments described herein include a lens assembly being formed of a plurality of cells, each cell formed as a column oriented transverse to a direction of travel of the acoustical signals. Each cell comprises a plurality of cell segments with each cell segment of the plurality comprising at least one arcuate wall and at least one radial finger, and wherein the cell segments are oriented in alignment with a rhodonea conformal mapping geometry in a plane transverse to the column to cause acoustic waves to travel at a different speed in each of three orthogonal directions. Each cell may be formed as a column oriented transverse to a direction of travel of the acoustical signals.

Embodiments may include using at least one acoustic sensor to produce acoustic information responsive to an acoustic wave from the cement annulus. The sensor may include at least one hyperlens along with at least one acoustic transmitter and/or at least one acoustic receiver, which may be implemented as transducers. In some implementations, the same transducer may serve as both transmitter and receiver. The information is indicative of a parameter of interest. The term "information" as used herein includes any form of information (analog, digital, EM, printed, etc.), and may include one or more of: raw data, processed data, and signals.

Methods may include estimating a parameter of interest from the information, evaluating the cement annulus using the parameter of interest, and performing further borehole operations in dependence upon the evaluation or the parameter of interest. In particular embodiments, a state of drilling operations, characteristics of the borehole, casing, cement, or formation, or a bond between cement and casing, may be estimated using the parameter of interest, and then used in performing an operation as described above.

FIG. 1 schematically illustrates a downhole acoustic logging system 100 having a downhole tool 10 configured to acquire information using a sensor 20, comprising at least one acoustic transmitter and at least one acoustic receiver, while in a borehole 50 in an earth formation 80 and estimate a parameter of interest. The parameter of interest may relate to properties of the casing 40 or cement 45 within the borehole 50, or characterization of the bond between them.

The sensor 20 may include one or more acoustic transmitter and/or receivers. The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a drill string, coiled tubing, a slickline, an e-line, a wireline, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

A surface control system 65 receives signals from downhole sensor 20 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 30 at a suitable location on downhole tool 10. The surface control system 65 may process data relating to the operations and data from the sensor 20, and may control one or more downhole operations performed by system 100.

In one embodiment, electronics associated with sensor 20 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the sensor(s). Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user. Information may also be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, electronics associated with the transducers, described in further detail below, may be configured to take measurements at a plurality of azimuthal orientations as the tool moves along the longitudinal axis of the borehole ('axially') using sensor 40. These measurements may be substantially continuous, which may be defined as being repeated at very small increments of depth and azimuth, such that the resulting information has sufficient scope and resolution to provide an image of borehole parameters (e.g., acoustic properties of the fluid in and formation at the borehole) or parameters relating to casing, cement, or the bond between them (collectively, "downhole parameters").

In other embodiments, electronics may be located elsewhere (e.g., at the surface, or remotely). To perform the treatments during a single trip, the tool may use a high bandwidth transmission to transmit the information acquired by sensor 40 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

A surface control system or downhole control system may be configured to control the tool described above and any incorporated sensors and to estimate a parameter of interest according to methods described herein. Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 2:
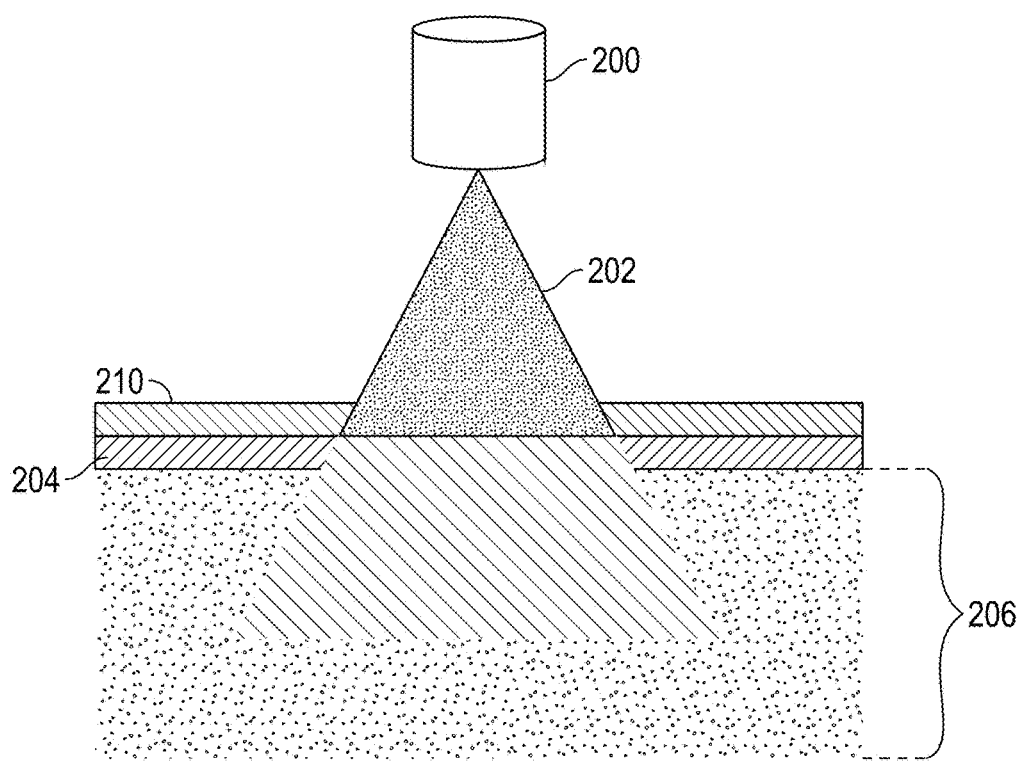
FIG. 2 illustrates a source for generating a signal in accordance with embodiments of the present disclosure.

FIG. 1 schematically illustrates a downhole acoustic logging system FIGS. 3A-3E illustrate example metamaterial cells with cell segments oriented in alignment with a rhodonea conformal mapping geometry for manipulating an acoustic wave in accordance with the present disclosure. FIG. 2 illustrates a source 200 for generating a signal 202, which may be sonic or ultrasonic. An aberrating media 204 may partially or completely obstruct the path of the signal 202 to a volume of interest 206. By obstruct, it is meant that the media 204 has one or more properties or characteristics that can block, distort, refract, reflect or otherwise undesirably affect the signal 202.

Embodiments of the present disclosure position a lens 210 formed of an acoustic metamaterial between the source 200 and the aberrating media 204. The lens 210 is shaped and configured to manipulate the signal 202 in a manner that minimizes undesirable effects in the signal 202 due to the aberrating media 204. Specifically, the lens 210 may have anisotropic properties and may transmit longitudinal acoustic waves at a different speed in each of three orthogonal directions. The metamaterial making up the lens 210 may also deform with a different bulk moduli in each of the same three orthogonal directions. As a result, the lens 210 may be characterized by an anisotropic density tensor (diagonalized) and an anisotropic bulk modulus tensor having terms that are highly frequency dependent. In certain instances, these characteristics may generate an unnatural manipulation of incident acoustic energy that enhances evanescent, or rapidly disappearing, wave vector components of incident energy. This manipulation of acoustic energy can lead to the formation of complementary or quasi-complementary wave vectors that transmit the acoustic energy through an adjacent aberrating media with minimal loss or distortion relative to the incident energy.

The characteristics of such metamaterials derive from the basic dynamic mechanism of resonances, occurring in aggregate, to affect the creation of material properties beyond the bounds of Nature. In the particular case of acoustic metamaterials, these characteristics begin directly from the frequency response behavior of the two basic material parameters: effective mass density and effective bulk modulus. Both of these material parameters can take on negative attributes and even anisotropic behavior in the presence of particular types of resonance transition zones, specifically within proximity of anti-resonances. These anisotropic and negative properties can give rise to a wide range of spectral features within certain frequency bands, including negative refraction and hyperlensing, which can open possibilities for beam focusing and amplification in flat lenses. Actions such as focusing and amplification will be generally referred to as manipulating an acoustic wave.

Negative index properties arising from unit cell resonance within the frequency band may occur over a very narrow spectral bandwidth, the range of which is an effect of the resonance characteristics of the unit cell and the properties of the matrix and/or background fluid. In order to affect these negative properties over a broader frequency range, a multitude of compatible resonances in the elemental cell must couple constructively. This can be achieved through the metamaterial unit cell designs of the present disclosure.

There are several factors determining whether a particular unit cell design can affect the dispersion characteristics of a propagating wave to the extent of exhibiting anisotropic and negative index properties behavior necessary for hyperlensing. One particularly relevant factor is the creation of an aggregate of resonances in the transmission coefficient spectra that will couple to form a wide band of wave manipulation in the frequency range of interest. Whether the frequency band formed from the aggregate will give rise to anisotropic and negative index responses is a function of other properties of the resonance couplings. The extent to which a unit cell design exhibits significant acoustic impedance mismatch, absorption loss, and/or significant magnitude of bulk modulus are dominant influences, since any one of these can negate the hyperlensing effect in the frequency band. Cells according to the present disclosure may be referred to as elemental components in the superlens or hyperlens, depending on their characteristics.

FIGS. 3A-3E illustrate example metamaterial cells with cell segments oriented in alignment with a rhodonea conformal mapping geometry for manipulating an acoustic wave in accordance with the present disclosure.

FIG. 3A illustrates the cell 310. Generally, each cell 310 is a platen and disc like member. The cell 310 has two opposing planar surfaces that are parallel. As illustrated, the visible planar surface 313 is parallel with the paper. The distance between the two surfaces, or thickness, may be in the range of 1 millimeter to 100 millimeter. The diameter of a circle enclosing the cell 310 may be in the range of 1 millimeter to 5 millimeter. These dimensions are generally selected to allow phenomena such as resonances to have a measurable influence on the behavior of the cell 310 and affect wave manipulation in the particular frequency ranges of interest. The cells, such as cell 310, of the present disclosure may be made up of walls 303 formed of metals or non-metals. Suitable metals include, but are not limited to, steel, platinum, tungsten, gold, and exotic options such as iridium, with the important material property for acoustic wave manipulation being the mass density of the metal.

FIG. 3B illustrates a conformal mapping geometry used as a segment template. The geometry may be derived using a rhodonea conformal mapping coordinate transformation in accordance with embodiments of the present disclosure. The rectangular Cartesian coordinates may be related to the mapped coordinates by the relations:

$$x = \pm \frac{1}{\rho}\sqrt{\rho + u}$$
$$y = \pm \frac{1}{\rho}\sqrt{\rho - u}$$
$$\rho = \sqrt{u^2 + v^2},$$

where [u,v] are the Rhodonea conformal domain coordinates.

Referring to FIG. 3B, the curvilinear interleaf geometry of cell 310 may be constructed from a set of rhodonea constant coordinate contours 301 with [x, y] coordinates located within a four-leaf boundary of the Cartesian frame such that the leaf walls 303 align with the set of contours 301. FIG. 3B illustrates the set 301 of contours 311. See P. Moon and D. E. Spencer, Field Theory Handbook, New York: Springer-Verlag, 1971.

Figure 3C:
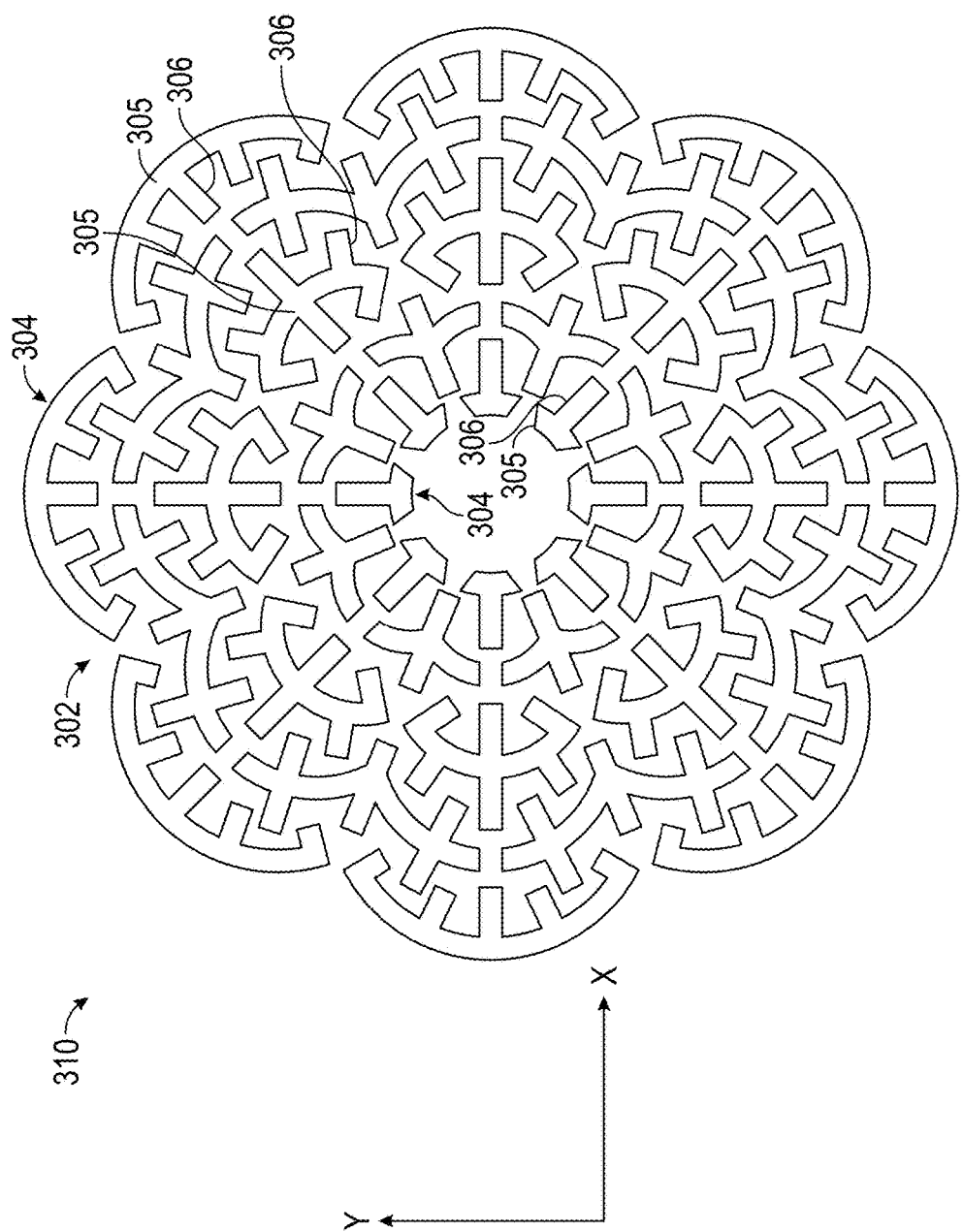

FIG. 3C shows an example cell in greater detail. The cell geometry develops focus lines concentrated within the cell loci which translate into the acoustic wave propagation field, thus extending the interaction path length of the wave with the resonant features of the cell. The double anisotropy leads to resonant hyperbolic frequency dispersion characteristics that generate quasi-complementary thru-casing ultrasonic transmissions with a flat lens design.

The cellular interleaf 302 is formed with curvilinear periodicity in both directions along the [u,v]contours, with constant leaf wall thickness aligned with the contour tangent and normal vectors. The cell 310 comprises a plurality of cell segments 304 with each cell segment of the plurality comprising at least one arcuate wall 305 and at least one radial finger 306. The cell segments 304 are oriented in alignment with a rhodonea conformal mapping geometry in a plane transverse to the column.

In some implementations, there may be an asymmetric mass distribution along the length of the fingers 306. To interleave the fingers 306, the radial positions of the fingers 306 may be staggered for each successive arcuate wall 305. Thus, a finger 306 of one wall 305 may nest radially between two fingers 306 of one or more adjacent walls 305. Greater or fewer fingers 306 may be used.

The resonances and anti-resonances within the cell 310 are affected by the interaction of the various structural features through the matrix or background fluid medium described above. Thus, the number, size, shape, and orientation of features such as the fingers 306 and walls 305 influence where and to what extent resonances and anti-resonances occur and how they complement or negate one another in affecting manipulation and control of the incident acoustic wave. Any number of segments may be used.

The lattice geometry of the cell is configured according to the conformal mapping above. The cellular lattice may be formed with rectilinear periodicity in both directions along the x and y axes, with a constant size cell geometry. Configuration may be carried out by building the cell—that is, iteratively adding design elements to the mapping—as described in the workflow immediately below.

Figure 3D:
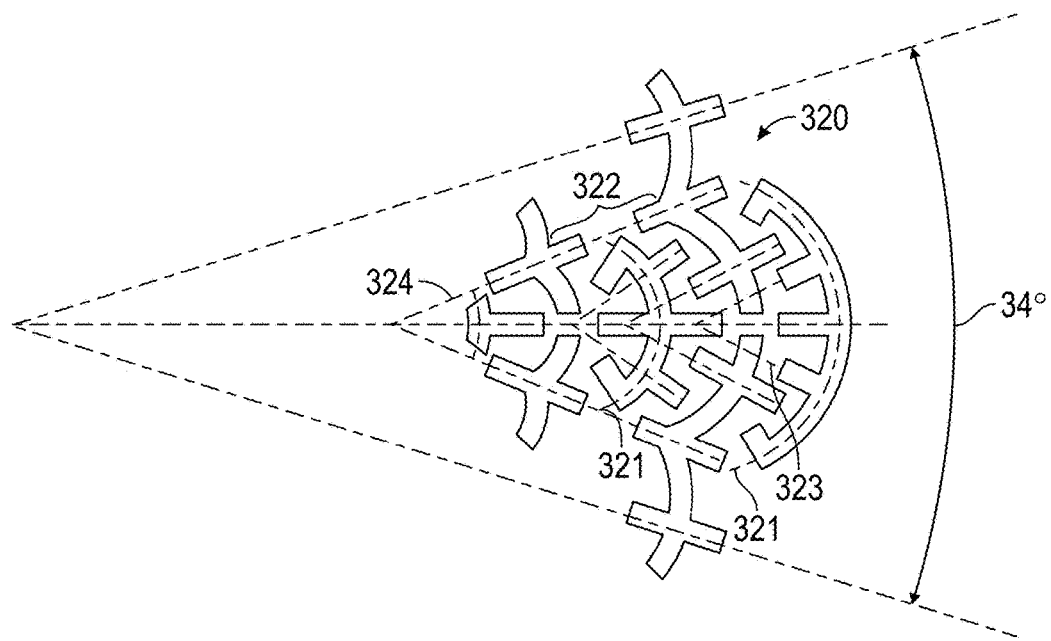

FIG. 3D illustrates an example sub-cell pattern. The basic sub-cell 320 is formed between two radial segments collinear with the u=0 and v=0 rhodonea contours. Successive perpendicular finger patterns 323 are generated along incrementally increasing v contours 321, until the u v divider line 324, then along incrementally decreasing u contours. The inherent flowlines of the interleaf periodicity then converge to a focus within the cell locus.

In embodiments, the fingers may be tab or bar like elements that can move independently relative to one another. By moving, it is meant bending, twisting, vibration, etc. Fingers may project radially inward toward a focal point, project radially outward, or both. The shape, size, number, and orientation of the segments, and their corresponding walls and fingers and the relationship between portions of adjacent segments may be varied in order to influence the resonant dispersion behavior of the cell. Further, the cells according to the present disclosure need not be symmetric or quasi-isotropic as shown in FIGS. 3A-3C.

Certain embodiments of the present disclosure may incorporate anisotropy in the shape factor to influence the bandwidth and hyperlensing effect of negative index resonant bandwidths formed by a cell. In one methodology, anisotropy may be applied by invoking geometry shaping transformations that maintain the invariance of the Helmholtz wave equation; e.g., a Joukowsky shaping transformation. For instance, the transformation may be described by the relation:

$$\xi = Z + \frac{b^2}{Z}$$

with the original cell coordinates:

$Z = x + iy$ and the transformed (shaped) cell coordinates:

$\xi = u + iv$.

Therefore, the Joukowsky transformation for an octagonal interleaf cell is:

$$[u + iv] = x\left[\frac{2S}{S+1}\right] + iy\left[\frac{2}{S+1}\right]$$

To introduce anisotropy in the frequency dispersion characteristics of the cell, a shaping of the basic isotropic geometry is imposed. The shaping transforms the symmetric rhodonea cell geometry shown in the figures accompanying the description above, that can be circumscribed by a circle of radius R, into a cell geometry that can be circumscribed by an ellipse with major and minor axes of length a and b, respectively, shown in FIG. 3E.

Figure 3E:
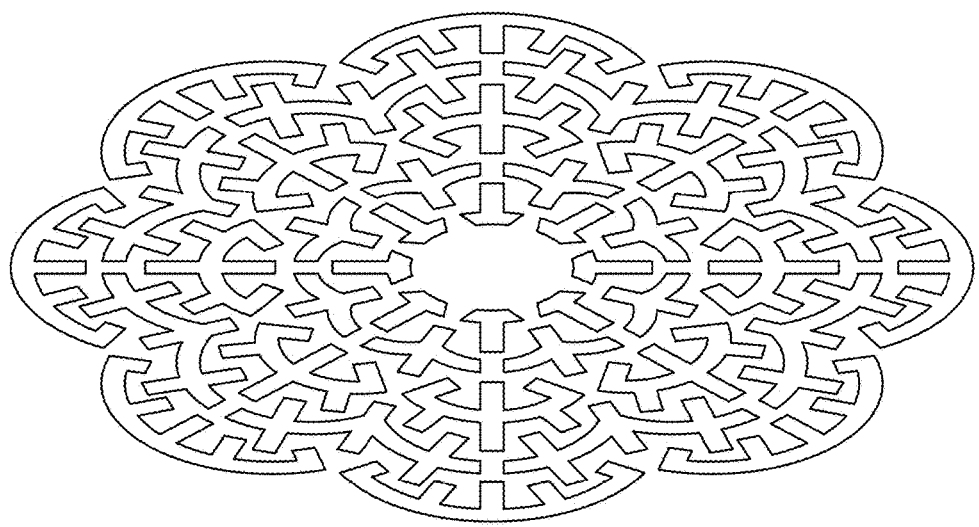

Referring to FIG. 3E, the anisotropy is characterized by a shaping factor S=a/b in the equation:

$$[u + iv] = x\left[\frac{2S}{S+1}\right] + iy\left[\frac{2}{S+1}\right].$$

The anisotropy effect in the cell geometry was generally found to shift the dominant bandwidth of hyperbolic frequency dispersion to lower frequency ranges with increasing anisotropy (S>1). Also, the transmission-reflection (T-R) simulations for effective properties retrieval revealed that the cell geometry generated anisotropy in both effective density and effective modulus of the metamaterial. The fundamental fluid constitutive models typically found to describe acoustic metamaterials assume perfect isotropy in the effective bulk modulus properties and do not account for the anisotropic modulil characteristics, such as those exhibited with this cell design. A tensor representation may therefore be employed for both the effective density and modulus in order to have a basic theoretical model for exploring the frequency dispersion characteristics of this cell.

These equations may be used to transform the 2D geometrical [x,y] coordinates of the cross-section for the quasi-isotropic cell illustrated previously in FIG. 3B with an anisotropic Joukowsky transformation with shape factor S=2 anisotropy in the cell shape. The resulting anisotropic cell 390 is shown in FIG. 3E. The S=2 anisotropy is merely one illustrative value.

In some instances of anisotropic shaping, a thickness of at least two fingers varies non-linearly along the plane on which a cell lies. For example, the thickness of fingers, 392, 394, and 396 are different and the difference is mathematically non-linear. The comparison of thickness may be done by selecting the same feature (e.g., an enlarged section) and measuring a distance along the same location along the same axis. An anisotropic shaping may also be applied to the cells of FIG. 3A or 3C, or other cell configurations according to the present disclosure.

Figure 4A:
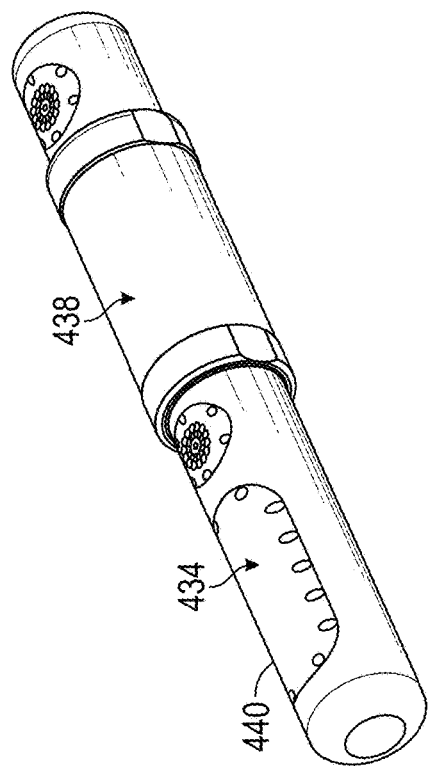
FIGS. 4A-4E illustrate downhole tools and tool components in accordance with embodiments of the present disclosure.
Figure 4B:
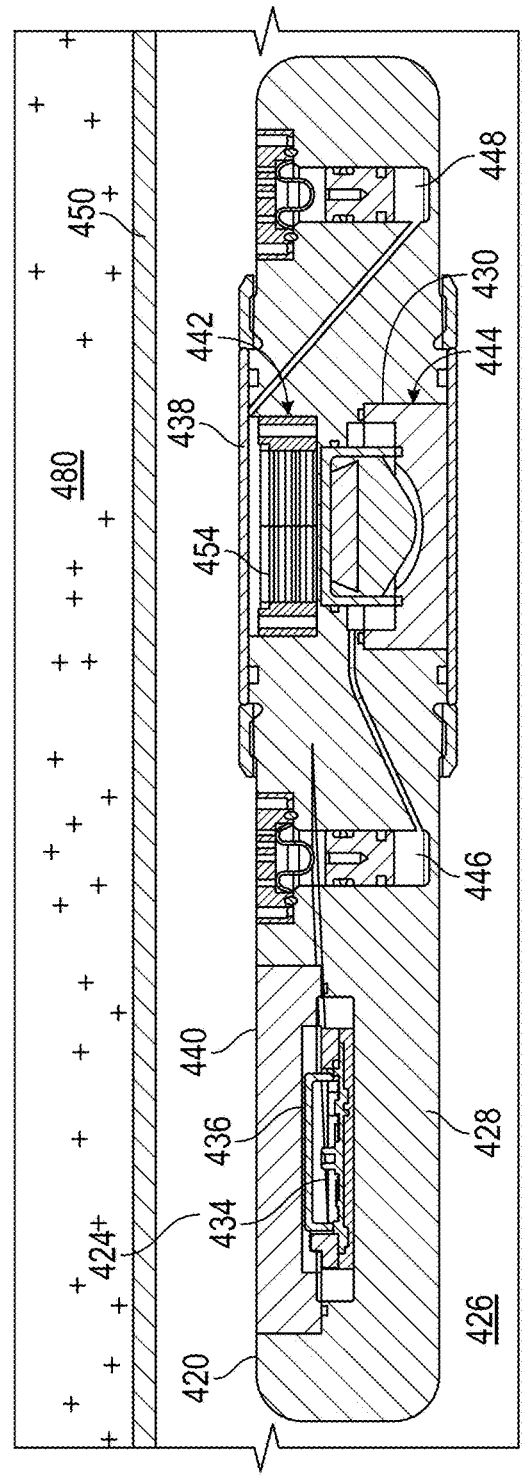

FIGS. 4A-4E illustrate downhole tools and tool components in accordance with embodiments of the present disclosure. Referring to FIG. 4A, there is shown one embodiment of an acoustic tool 420 according to the present disclosure. A perspective view is shown in FIG. 4B. The tool 420 may be conveyed by a suitable conveyance device (not shown) along a borehole 424 drilled in an earthen formation 426. The conveyance device may be a non-rigid carrier such as a wireline, e-line, slick-line, or coiled tubing, a rigid carrier such as drill pipe, a drop tool, or an autonomous device. In one non-limiting embodiment, the tool 420 includes an enclosure 428 that has an acoustic source cavity 430 that receives an acoustic source assembly 432 and an electronics cavity 434 that receives an electronics assembly 436. A cavity sleeve 438 seals and encloses the acoustic source assembly 432 in the acoustic source cavity 430. The window 438 may be constructed and formed to have similar acoustic impedance with the fluid filling the lens cavity 442; e.g., fabricating the window from Teflon material and using pure water as the lens cavity fluid. A cover 440 seals and encloses the electronics assembly 436 within the electronics cavity 434. The acoustic source cavity 430 may have a lens section 442 and a source section 444. Pressure compensation cavity 446 and 448 equalize the pressure between the exterior of the enclosure 428 and the sections 442 and 444, respectively. The pressure compensation fluid in source section 444 will in general have acoustic impedance properties different than those of the fluid in lens section 442. The fluid properties in lens section 442 are variables dictated by the cell acoustic properties and the frequency range desired.

The acoustic source assembly 432 generates and emits acoustic energy that can pass through an aberrating media with reduced distortion. In some situations, the aberrating media may include the metal making up casing 450. In one embodiment, the acoustic source assembly 420 includes a transducer 452 and a lens 454. The transducer 452 may be any device configured to generate and receive sonic or ultrasonic signals. One illustrative non-limiting source may include piezoelectric elements.

Figure 4C:
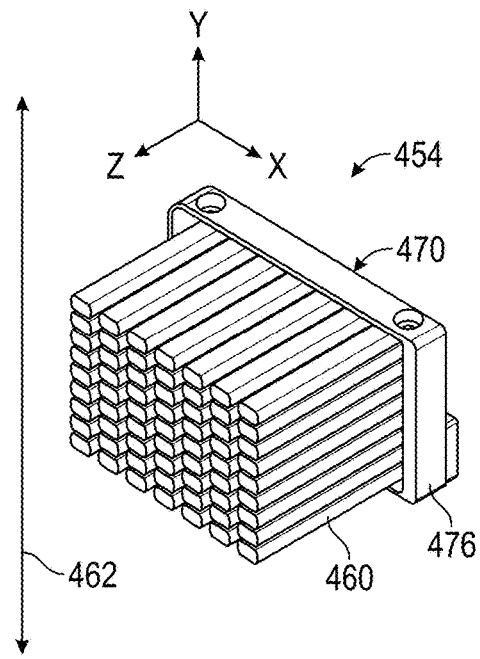
Figure 4D:
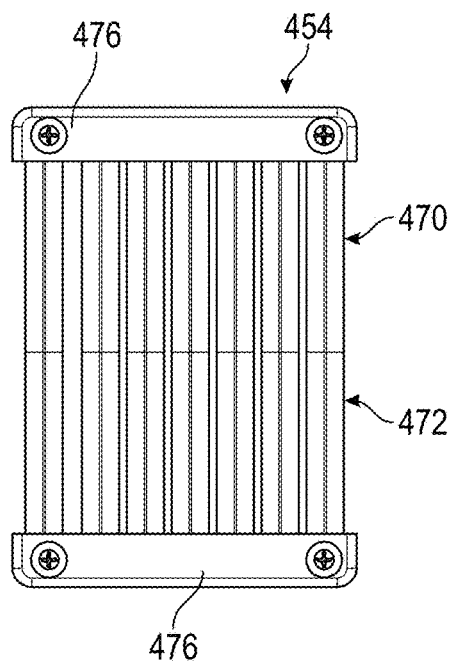
Figure 4E:
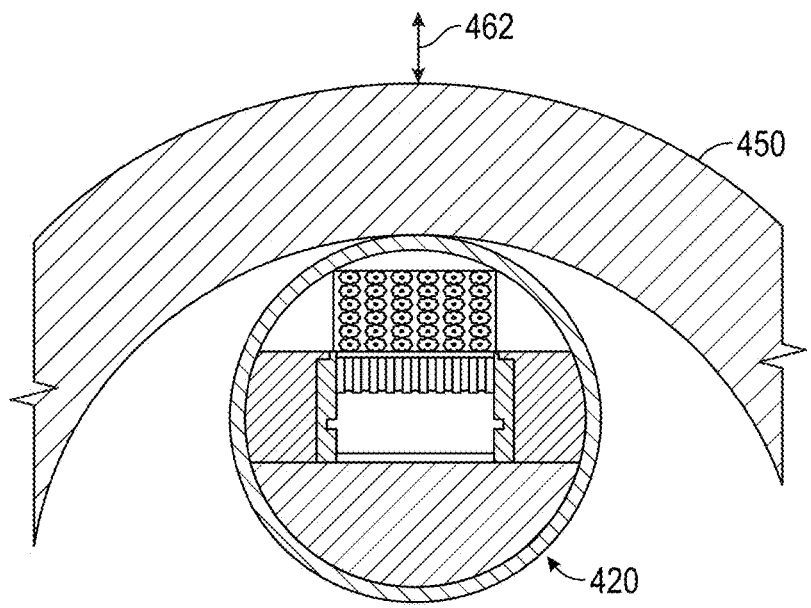

The lens 454, which is better illustrated in FIGS. 4C and 4D, includes a plurality of cells 460 arranged in a grid-type manner. Each cell 460 may be shaped as a column that extends orthogonally/transversely to a direction of signal propagation, which is shown with arrow 462. The illustrated embodiment includes two sections 470, 472, each of which has a base 476 from which the cells 460 project in a cantilever-type fashion. The sections 470, 472 are arranged to mirror one another. Further, the cells 460 are aligned such that two facing cells 460 form effectively one column-like structure between the two bases 476. The facing cells 460 may be separated by a gap, contact one another, or be fixed to one another. In embodiments, one end of the cell 460 may be fixed or both ends may be fixed. The cells 460 may have any of the cross-sectional shape and structures that were discussed above. It should be understood that the lens assembly 454 is not limited to any particular distribution of cells 460 or that such a distribution be symmetric or conform to a particular geometric shape, except as otherwise explicitly indicated above. It should also be understood that the lens assembly 454 may include only one element (e.g., section) 470, from which the cells 460 project. Also, the lens assembly 454 may include an arrangement wherein two bases 448 are spanned by one cell 460 as opposed to two facing cells.

The electronics assembly 436 may include suitable electronics, microprocessors, memory modules, algorithms, power supplies, and circuitry in order to drive and sense the acoustic transducer 452. The electronics assembly 436 may also include bi-directional communication hardware in order to transmit and/or receive data signals.

Referring to FIGS. 4A-4D, an illustrative mode of operation of the acoustic tool 420 involves evaluating a cement body 480 (FIG. 8), i.e., a volume of interest, that surrounds a well casing 450. The well casing may be formed of a metal, such as steel. The evaluation may include estimating a quality of the contact or bond between the cement and the well casing 450. During use, the electronics assembly 436 activates the acoustic transducer 452. In response, the acoustic transducer 452 emits acoustical waves through the lens 454 along the arrow 462. The acoustic waves may be sonic or ultrasonic and may have a narrow or wide frequency band. It should be noted that the waves enter the cells 420 along a surface facing toward the acoustic transducer surface and exit the cells 420 along a surface facing away from the acoustic transducer 452. Thereafter, the acoustical waves pass through the well casing 450 and into the cement body 480. As discussed previously, the lens 454 manipulates the acoustic waves in a manner that allows these waves to pass through the metal of the well casing 450 with reduced distortion. A reflected wave 430 returns from the formation and enters the lens 454. After being manipulated by the lens 454, the wave 420 enters the transducer 452 and is processed.

The lens 454 can reduce distortion in acoustic signals that have already travelled through the aberrating media 204 as well as for acoustic signals travelling into the aberrating media 204. That is, the lens 454 can manipulate an acoustic signal emitted into the aberrating media 204 and also manipulate a reflected signal from the zone of interest 206 that has travelled through the aberrating media 204. Thus, the transducer 452 can act as a signal emitter and a signal detector.

Generally, it may be desirable to evaluate a parameter or characteristic, such as a cement bond, along a complete circumference at a specified depth in the well. Thus, embodiments of the present disclosure may mount the tool 420 on a platform that is rotated by a suitable rotary device such as an electric or hydraulic motor. In some instances, the conveyance device on which the tool 420 is mounted, e.g., a drill string, may be rotated. In still other embodiments, a stationary array of two or more tools 420 may be circumferentially distributed along a plane in order to obtain full circumferential coverage.

Figure 5A:
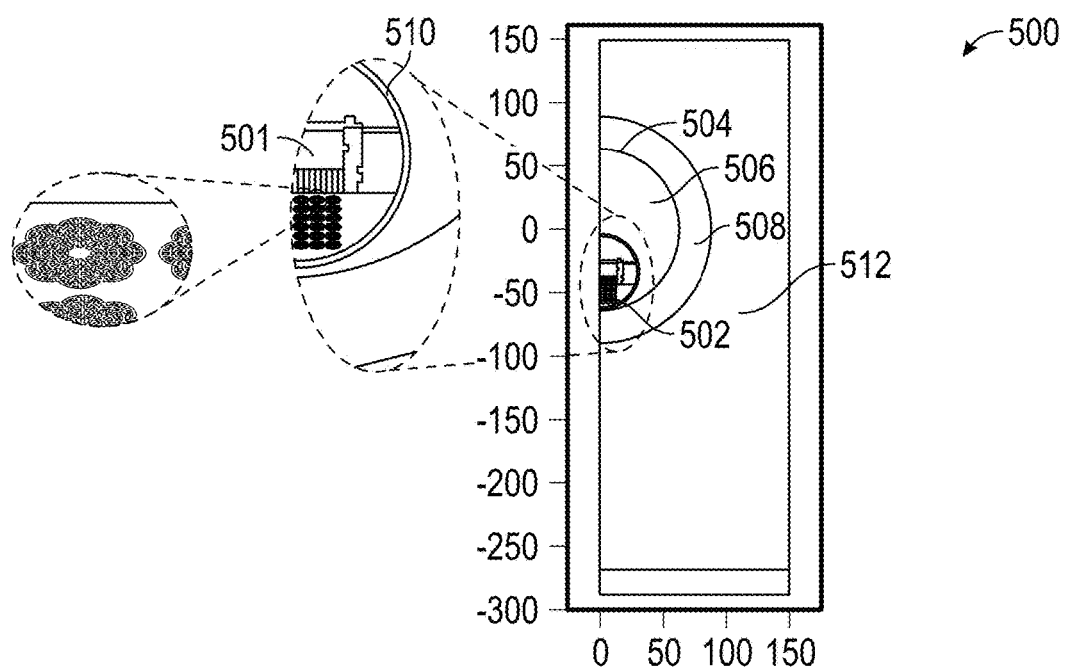
FIGS. 5A & 5B illustrate a model simulating performance of apparatus embodiments in accordance with the present disclosure.
Figure 5B:
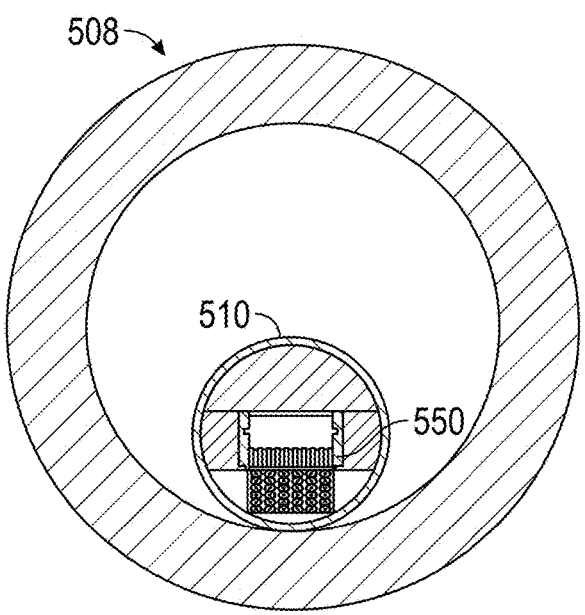

FIGS. 5A & 5B illustrate a model simulating performance of apparatus embodiments in accordance with the present disclosure. A finite element model 500 was developed having the hyperlens 502 completely immersed in a water background inside a 60 mm outer diameter ('OD') Teflon sleeve 510 (2 mm thick). The wellbore fluid inside the casing is a typical mud 506. The fluid outside the casing is a semi-infinite cement domain 512. The acoustic source 501 is a detailed representation of the piezo-composite transducer with PZT-5A pillars embedded in epoxy with a plastic housing with a 1 mm gap 550 between the source and the hyperlens 502. The Teflon sleeve 510 is located eccentric within the wellbore 504 to form a 1 mm gap between the Teflon sleeve and the ID of the wellbore 504. The wellbore 504 is defined by the casing 508.

Figure 6:
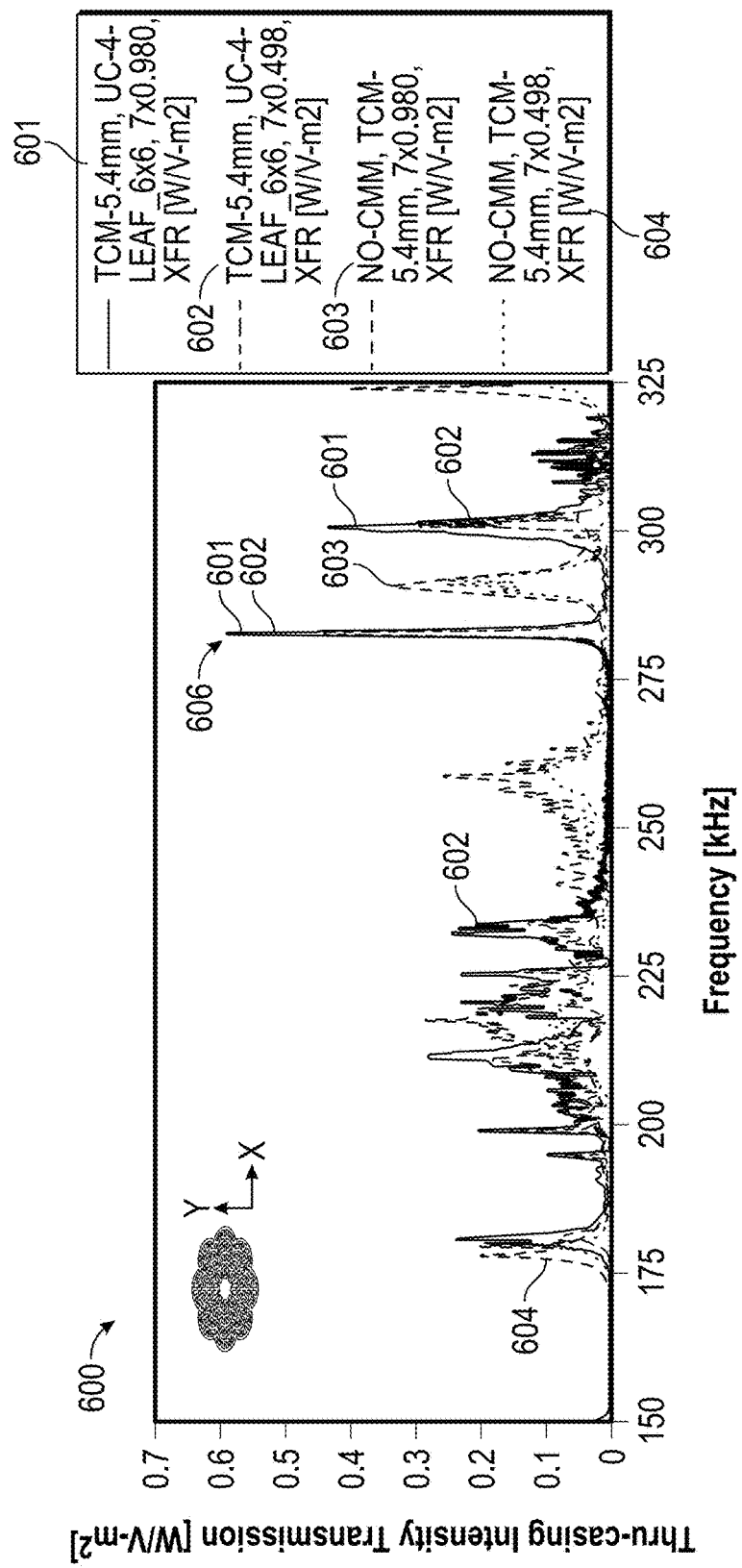
FIG. 6 shows a graphical depiction of illustrative theoretical plots of thru-casing intensity transmission for the hyperlens having a cell-Y oriented lens array.

FIG. 6 shows a graphical depiction 600 of illustrative theoretical plots of thru-casing intensity transmission for the hyperlens having a cell-Y oriented lens array. Graphical depiction 600 was derived from simulation results using finite element analysis. The spectra for hyperlens cases (601 and 602) are shown for two standard 7" OD API casing thicknesses (0.980 inch casing, or thick casing; and 0.498 inch casing, or standard casing), and the spectra for the no-lens control-case (603 and 604) are superimposed for comparison.

Lines 603 and 604 illustrate the intensity of an acoustic transmission over a range of frequencies for a thru-casing signal for the two casing thicknesses corresponding to thick casing and standard casing.

Lines 601 and 602 also illustrate the intensity of an acoustic transmission over a range of frequencies for a thru-casing signal for the two casing thicknesses corresponding to thick casing and standard casing. However, this signal is first manipulated by a lens as described above that has a cell with geometries as discussed above before entering the casing section. The frequencies at which the cell-Y thru-casing transmission phenomenon is observed correlate closely with those observed from theoretical slab calculations. Peaks 606 may occur as shown at a particular frequency. The resonances around 200 kHz and 300 kHz calculated in the theoretical analyses are observed in the detailed multiphysics finite elements analysis (TEA') simulations. The hyperbolic frequency dispersion resonance calculated at 304 kHz in the theoretical analyses is observed at 300 kHz in the multiphysics FEA simulations, while the theoretical resonance at 228 kHz is observed at 232 kHz. It should be noted the simulation of the signal altered by the lens assembly of the present disclosure features enhanced thru-casing acoustic intensity transmission compared to the control case without the hyperlens by about +32 dB at the hyperlens design resonance of 283 kHz and +22 dB near 300 kHz. It should be appreciated, that the increased signal intensity is obtained without increasing the amplitude of the voltage signal applied to the transducer.

FIGS. 7A, 7B, 8A & 8B illustrate simulation results for two casing thicknesses considered above at the hyperbolic resonance near 283 kHz. Nearly collimated intensity transmission into the cement domain is apparent through both thickness casings.

Figure 7B:
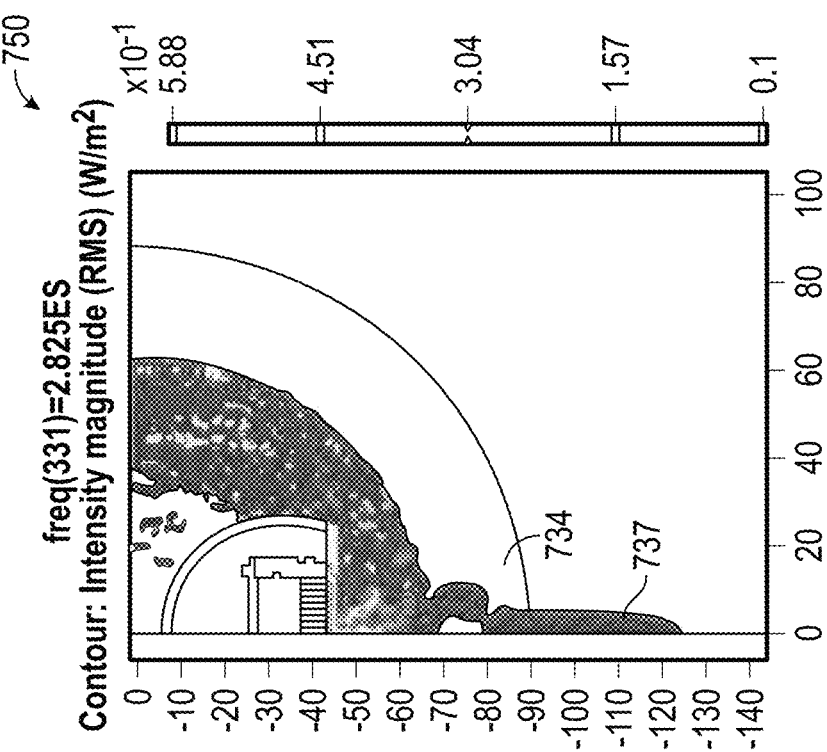
FIGS. 7A, 7B, 8A & 8B illustrate simulation results for two casing thicknesses considered above at the hyperbolic resonance near 283 kHz.
Figure 7A:
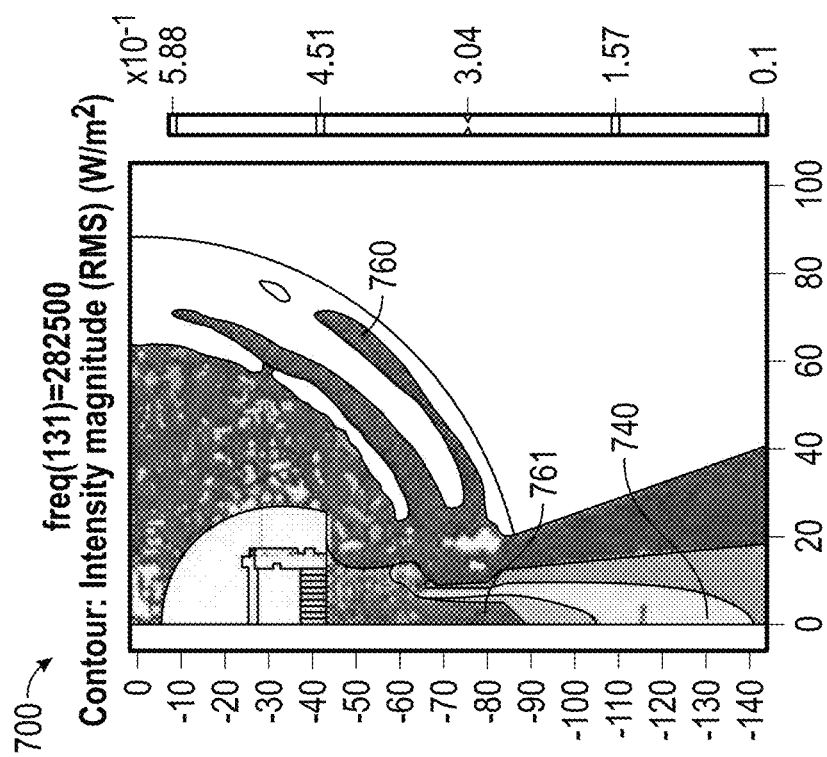

FIGS. 7A & 7B show contour plots 700 and 750, respectively, illustrating the acoustic intensity of acoustic waves emitted by a transducer 452 in a casing 734, fixed in a borehole, that is filled by a borehole fluid 737. Contour plots 700 and 750 are derived from simulation results with the detail model of the acoustic source using multiphysics modeling. The graphs 700, 750 depict an end view or top view; i.e., along a longitudinal axis of a borehole 736. Also, for simplicity, the tool modeling is done using a symmetric half-section. The dark blue areas 760 show regions of low acoustic intensity and the dark red regions 761 show areas of high acoustic intensity.

Figure 8B:
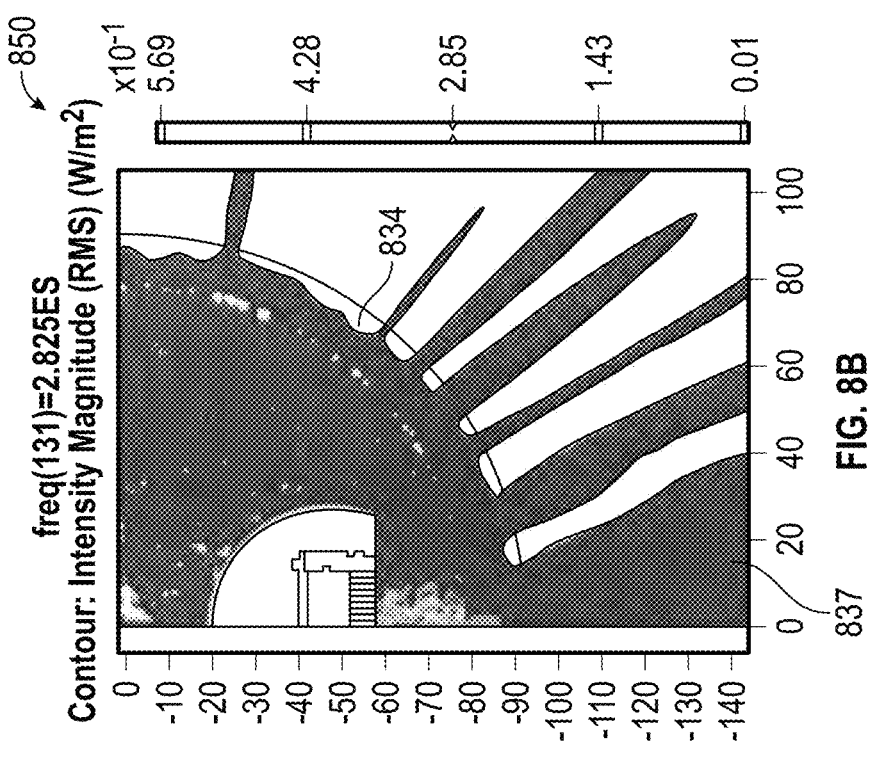
Figure 8A:
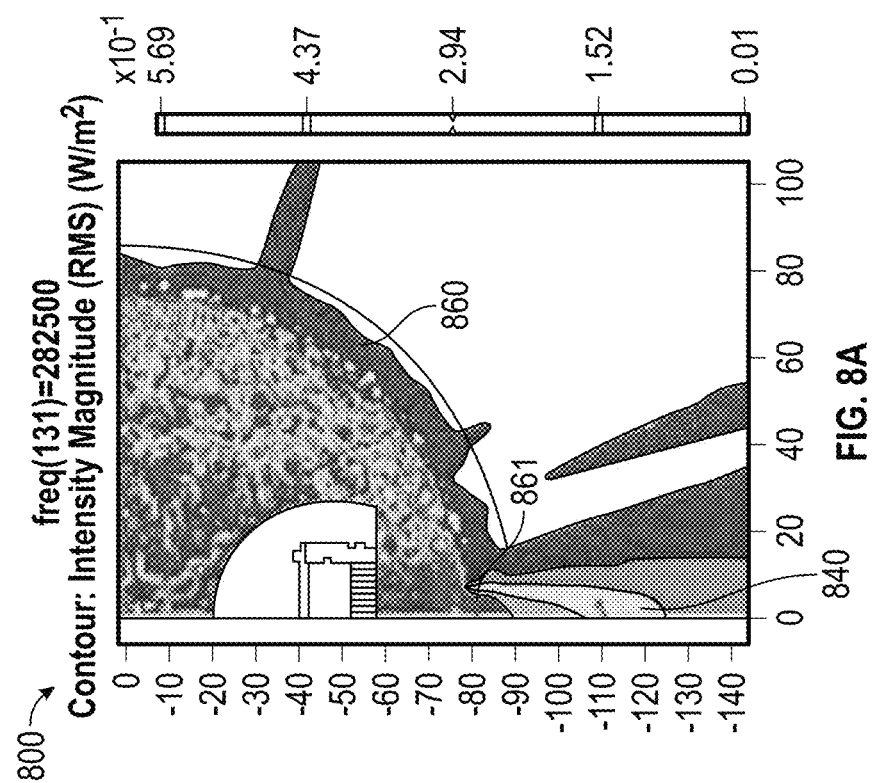

FIGS. 8A & 8B show contour plots 800 and 850, respectively, illustrating the acoustic intensity of acoustic waves emitted by a transducer 452 in a casing 834, fixed in a borehole, that is filled by a borehole fluid 837. Contour plots 800 and 850 are derived from simulation results with the detail model of the acoustic source using multiphysics modeling. The dark blue areas 860 show regions of low acoustic intensity and the dark red regions 861 show areas of high acoustic intensity.

In FIGS. 7A & 8A, the transducer 452 emits a signal through a lens 454. As can be seen, the lens 454 creates relatively focused zones, 740 and 840 in each respective case, of acoustic intensity along a radial direction from the transducer 452, which is generally considered desirable for acoustic imaging. The transmission half-power beam width (−3 dB) is approximately 20 mm wide (−1.4λ in the cement) for both thickness casings at the cement/steel bond interface. The half-power beam field extends more than 50 mm into the cement through the 0.98" thick casing. This is a sufficient depth to detect the cap rock interface in most scenarios. The half-power beam field extends about 35 mm into the cement through the 0.498" thick casing, less than through the thicker 0.98" casing, but is still sufficient for measurement.

In FIGS. 7B & 8B, the transducer 452 emits a signal directly into the casing 734. The acoustic intensity in the regions 737 and 837 along the radial direction from the transducer has a diffuse acoustic intensity of low magnitude in each case, which is generally considered undesirable for acoustic imaging. Numerical modeling suggests that the acoustic intensity in the regions 740 and 840 may be an order of magnitude higher than the acoustic intensity in the counterpart regions 737 and 837, respectively. One can observe the nearly collimated intensity transmission through the casing and into the cement domain. The transmission beam width (−6 dB) is approximately 15 mm wide at the cement bond interface with the steel casing.

An anomaly pertaining to reverberations in the casing can contaminate pulse echo propagations and preclude characterization of discrete sub-domain (∼λ) features of the cement annulus. Scattering of the thru-casing transmission field and the associated energy of casing reverberations, in the case without the hyperlens, can be effectively quiesced resulting in relatively small casing reverberation energy while simultaneously developing a confined and collimated thru-casing beam field. This quiescent phenomena associated with the hyperlens response may be expected to create a low noise floor compatible with pulse-echo type cement evaluation applications appropriate for detection of very small cement annulus reflection signals.

The sensor voltage echo response due to reflections is investigated using the same acoustic hyperlens FEA model as previously analyzed, but including a small circumferential pressure emitter at the interface between the steel casing and the cement domain. The pressure emitter is located in the steel/cement interface to simulate an anomalous current void reflection that has an arc length of 7.5 mm (approximately 38 percent of beam width). Implicit in this analysis is the assumption that the reflection coefficient for the interfacial anomaly is 1.

Figure 9:
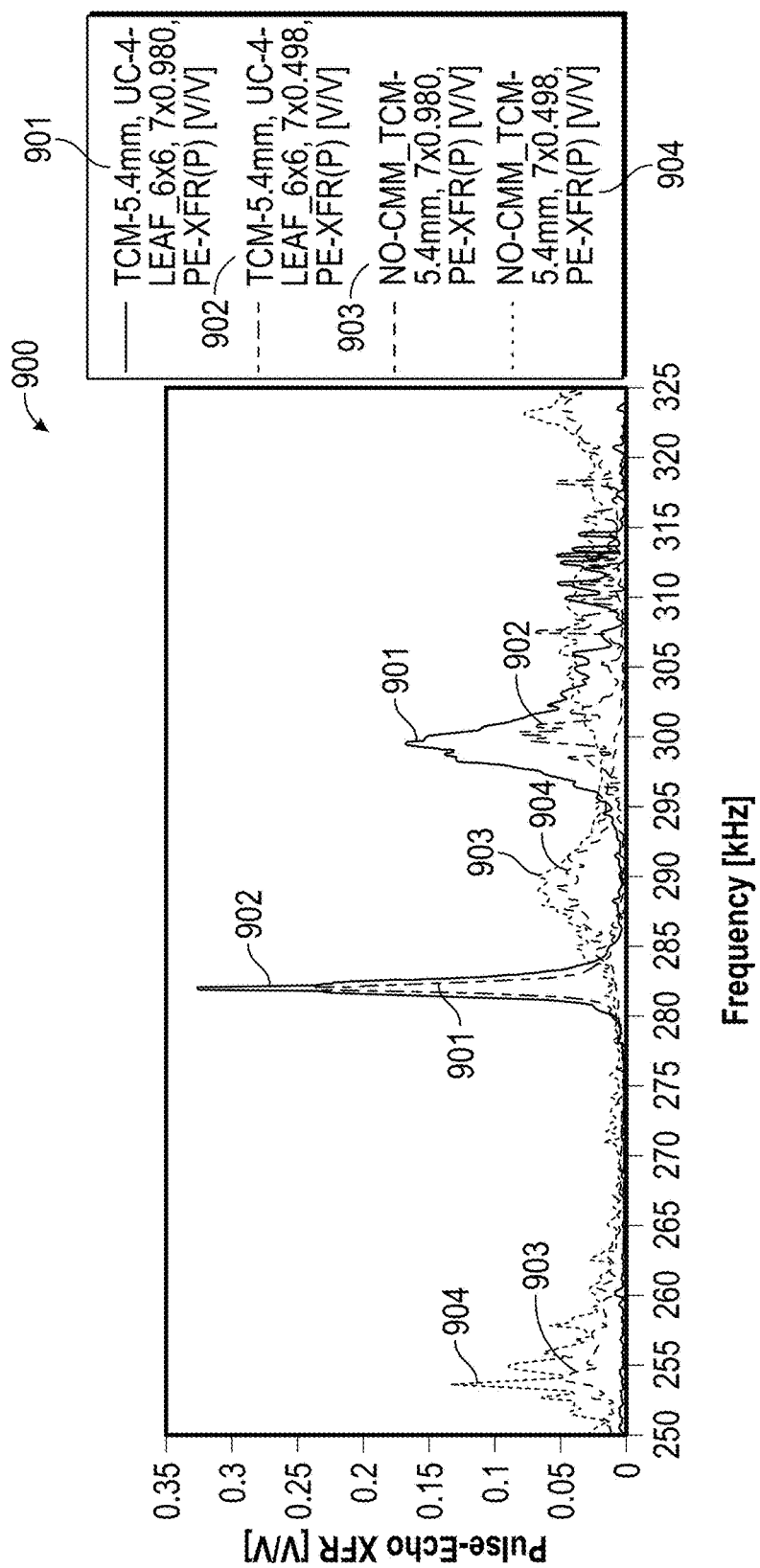
FIG. 9 shows a graphical depiction of illustrative theoretical plots of pulse-echo voltage signal frequency response spectra from thru-casing pressure transmission and the reflected waves.

FIG. 9 shows a graphical depiction 900 of illustrative theoretical plots of pulse-echo voltage signal frequency response spectra from thru-casing pressure transmission and the reflected waves. Graphical depiction 1000 was derived from a simulation similar to the finite element analysis of FIG. 6, but including a small circumferential pressure anomaly interface between the steel casing and the cement domain.

A pseudo-pulse-echo transfer function is constructed by first normalizing the pressure magnitude of the interface emitter to equal that of the pressure transmission for the thru-casing simulations shown above for a unit amplitude voltage. The average pressure magnitude that is transmitted back onto the original source boundary due to the reflection is normalized relative to the amplitude of the original ideal source, to provide a simulated (two-step) pulse-echo transfer function.

Curves 901-904 illustrate the frequency response spectrum for the simulated pulse-echo transfer function. The spectra for hyperlens cases (901 and 902) are shown for two standard 7" OD API casing thickness' (0.980" and 0.498"), and the spectra for the no-lens control-case (903 and 904) are superimposed for comparison.

The pulse-echo transfer function for the casing without the lens assembly (curves 903 and 904) indicate that the high transmission at the intrinsic casing resonance of 290 kHz does not reciprocate proportionately for the reflection back onto the source boundary. Thus, the high transmission at the intrinsic casing resonance of 290 kHz does not reciprocate proportionately for the echo mode, with 6% net voltage signal returned through the thick 0.98" casing. When taken in consideration with the inevitable simultaneous multitude of echo signals from the casing reverberations it is easily understood how this signal can be masked from detection in a conventional pulse-echo type sensor application. In contrast the curves 901 and 902 indicate that the hyperbolic resonance at 283 kHz and at 300 kHz both display good reciprocity for 0.98" thick thru-casing propagation, with 24% and 17% net voltage signals returned, respectively; and indicate that the hyperbolic resonance at 283 kHz displays good reciprocity of propagation for the thinner casing, with 32% net voltage signal returned, while the hyperbolic resonance at 300 kHz displays only about 8% net voltage signal return for the thinner casing.

While the present disclosure is discussed in the context of a hydrocarbon producing well, it should be understood that the present disclosure may be used in any borehole environment (e.g., a water or geothermal well). Also, embodiments may be used in acoustic tools used at the surface or in bodies of water.

"Conformal mapping geometry," as used herein, refers to an arrangement of cell segments within the cell such that the contour lines from a non-Cartesian coordinate system are mapped onto a surface. Herein the surface may be a flat base from which each cell projects in a cantilever fashion.

"Rhodonea conformal mapping geometry," as used herein, refers to a two dimensional curve described by a polar equation of the form $$r=\cos(k\theta)$$

or, alternatively, as a pair of Cartesian parametric equations of the form $$x=\cos(k\theta)\cos(\theta)$$

$$y=\cos(k\theta)\sin(\theta)$$

where k=n/d, wherein n and d are integers.

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. An apparatus for investigating a subsurface volume of interest from a borehole, comprising:
   an enclosure configured for conveyance along the borehole;
   an acoustic source in the enclosure configured to generate acoustic signals;

a lens assembly disposed in the enclosure and next to the acoustic source, the lens assembly being formed of a plurality of cells, each cell formed as a column oriented transverse to a direction of travel of the acoustical signals;

wherein each cell comprises a plurality of cell segments with each cell segment of the plurality comprising at least one arcuate wall and at least one radial finger, and wherein the cell segments are oriented in alignment with a rhodonea conformal mapping geometry in a plane transverse to the column to cause acoustic waves to travel at a different speed in each of three orthogonal directions.

2. The apparatus of claim 1, wherein the plurality of cells are arranged in a grid projecting from a common base.

3. The apparatus of claim 2, wherein the plurality of cells form a cellular lattice having rectilinear periodicity in both directions along the grid.

4. The apparatus of claim 1, wherein the plurality of cell segments have identical dimensions.

5. The apparatus of claim 1, wherein the plurality of cell segments project from a common base.

6. The apparatus of claim 1, wherein the conformal mapping geometry comprises a set of Rhodonea constant coordinate contours with [x,y] coordinates located within a four-leaf boundary of a Cartesian frame.

7. The apparatus of claim 6, wherein the rectangular [x,y] Cartesian coordinates may be related to [u,v] mapped coordinates by the relations:

$$x = \pm \frac{1}{\rho}\sqrt{\rho + u}$$
$$y = \pm \frac{1}{\rho}\sqrt{\rho - u}$$
$$\rho = \sqrt{u^2 + v^2}.$$

8. The apparatus of claim 1, the plurality of fingers are radially staggered to nest between one another.

9. The apparatus of claim 1, wherein the cell segments are arranged in alternating radial rings of cell segments, comprising alternating rings of segments of a first type and of a second type, wherein:
   segments of the first type comprise a single arcuate wall; and
   segments of the second type comprise a plurality of arcuate walls.

10. The apparatus of claim 1, further comprising a rotary device rotating the enclosure.

11. The apparatus of claim 1, wherein a metamaterial created by the plurality of cells deforms with a different bulk moduli in each of the three orthogonal directions.

12. The apparatus of claim 1, wherein the apparatus is configured to:

direct acoustic waves through an adjacent aberrating media that at least partially blocks the direction of travel of the acoustic waves to the volume of interest; and receive an acoustic signal responsive to acoustic waves transmitted comprising information relating to the volume of interest;

wherein received acoustic signals from a standard casing have substantially equivalent resolution to received acoustic signals from a thick casing.

13. A method for investigating a subsurface volume of interest, comprising:
   positioning an acoustic tool in a wellbore, the acoustic tool including:
      an enclosure configured for conveyance along the borehole;
      an acoustic source in the enclosure configured to generate acoustic signals;
      a lens assembly disposed in the enclosure and next to the acoustic source, the lens assembly being formed of a plurality of cells, each cell formed as a column oriented transverse to a direction of travel of the acoustical signals;
      wherein each cell comprises a plurality of cell segments with each cell segment of the plurality comprising at least one arcuate wall and at least one radial finger, and wherein the cell segments are oriented in alignment with a rhodonea conformal mapping geometry in a plane transverse to the column to cause acoustic waves to travel at a different speed in each of three orthogonal directions; and
   directing the acoustic waves through an adjacent aberrating media that at least partially blocks the direction of travel of the acoustic waves to the volume of interest.

14. The method of claim 13, wherein the aberrating media is a metal tubular.

15. The method of claim 14, wherein the volume of interest comprises cement.

16. The method of claim 15, further comprising estimating quality of a cement bond between the cement and the metal tubular.

17. The method of claim 13, further comprising rotating the acoustic tool.

18. The method of claim 13, further comprising using the acoustic transducer to detect a reflected signal from the volume of interest that has travelled through the aberrating media and the lens assembly.

19. The method of claim 13, further comprising:
   receiving an acoustic signal responsive to the acoustic waves comprising information relating to the volume of interest; and
   using the information to estimate a parameter of interest.

20. The method of claim 19, further comprising using the estimated parameter of interest to perform further borehole operations.

* * * * *